(No Model.) 3 Sheets—Sheet 1.

G. A. DICKERMAN & J. P. ELLACOTT.
HAY LOADER.

No. 479,353. Patented July 19, 1892.

Witnesses Inventors (No Model.) 3 Sheets—Sheet 2.
G. A. DICKERMAN & J. P. ELLACOTT.
HAY LOADER.

No. 479,353. Patented July 19, 1892.

(No Model.) 3 Sheets—Sheet 3.
G. A. DICKERMAN & J. P. ELLACOTT.
HAY LOADER.
No. 479,353. Patented July 19, 1892.
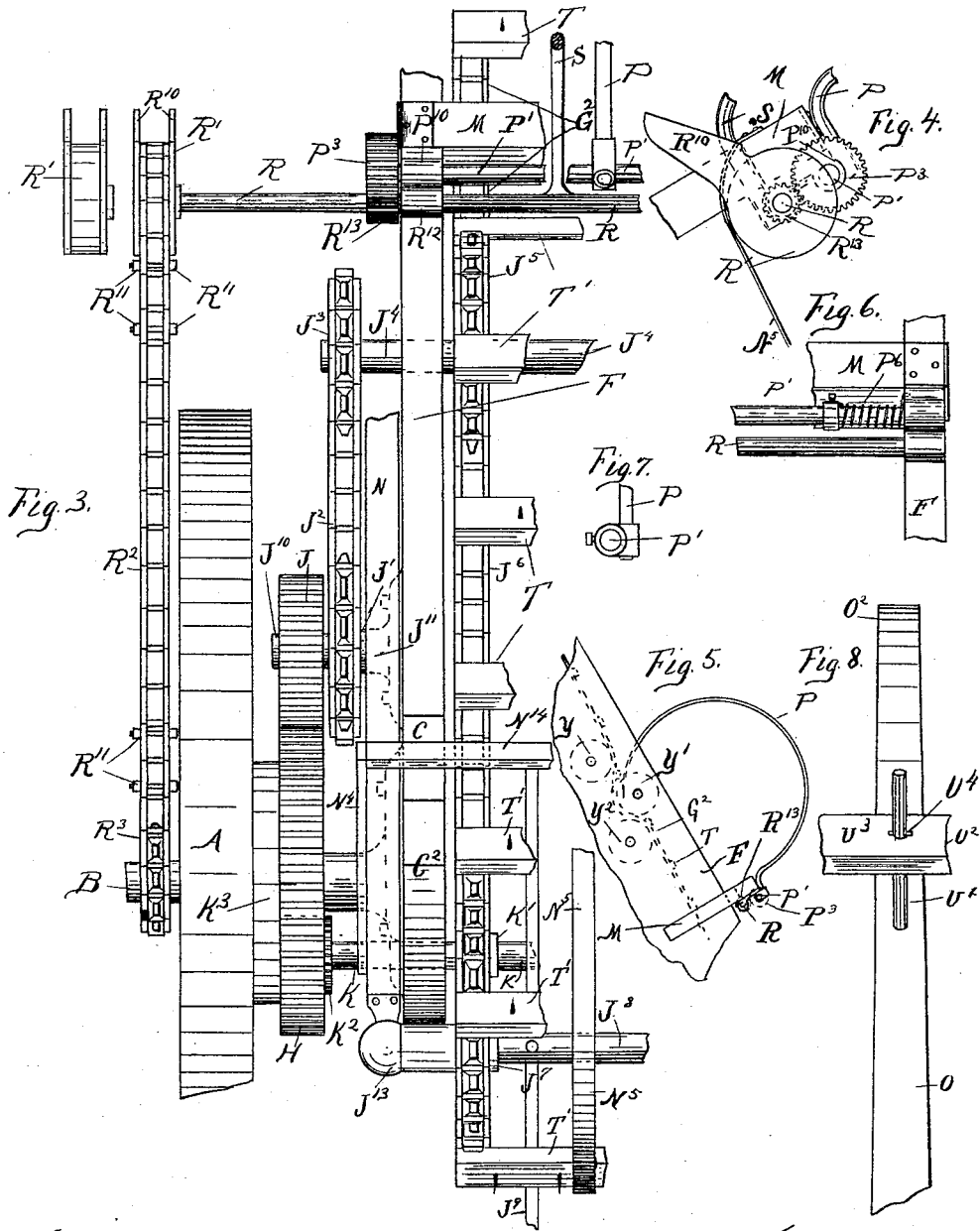

UNITED STATES PATENT OFFICE.

GEORGE A. DICKERMAN AND JOSEPH P. ELLACOTT, OF CHICAGO, ILLINOIS; SAID GEORGE A. DICKERMAN ASSIGNOR TO FRANCES S. DICKERMAN.

HAY-LOADER.

SPECIFICATION forming part of Letters Patent No. 479,353, dated July 19, 1892.

Application filed September 28, 1891. Serial No. 407,088. (No model.)

*To all whom it may concern:*

Be it known that we, GEORGE A. DICKERMAN and JOSEPH P. ELLACOTT, citizens of the United States, residing at Chicago, in the county of Cook and State of Illinois, have invented a certain new and useful Improvement in Hay-Loaders, of which the following is a full, clear, and exact specification.

Our invention relates to hay-loaders, and has for its object to provide certain improvements and devices for taking up hay from the ground and loading the same upon a wagon.

It is more fully described and claimed hereinafter.

It is illustrated in the accompanying drawings, wherein—

Figure 1:
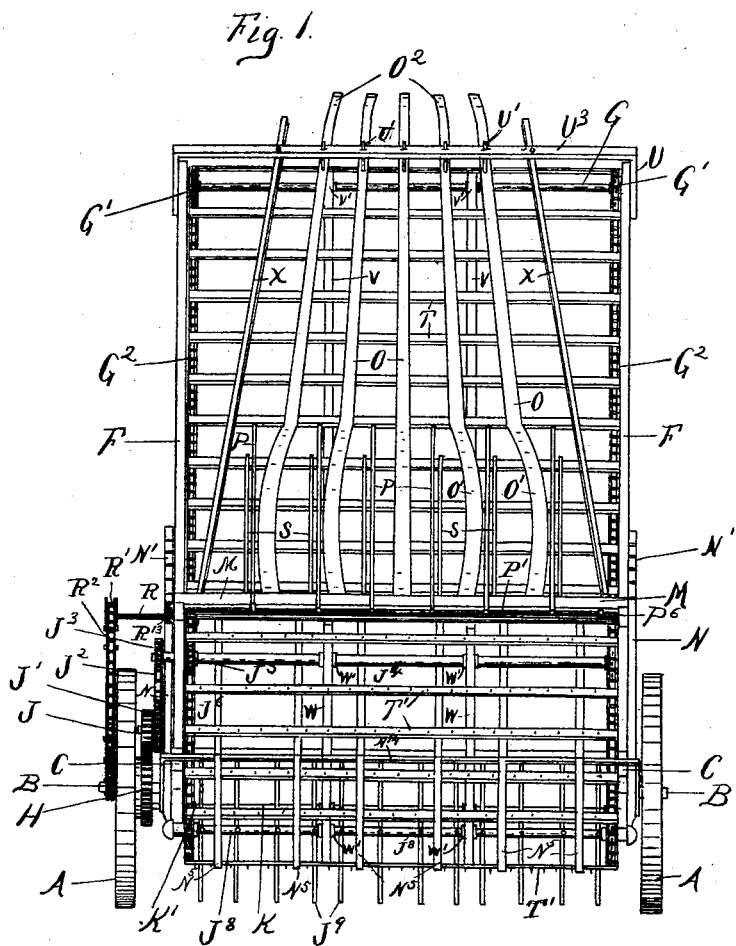
Figure 2:
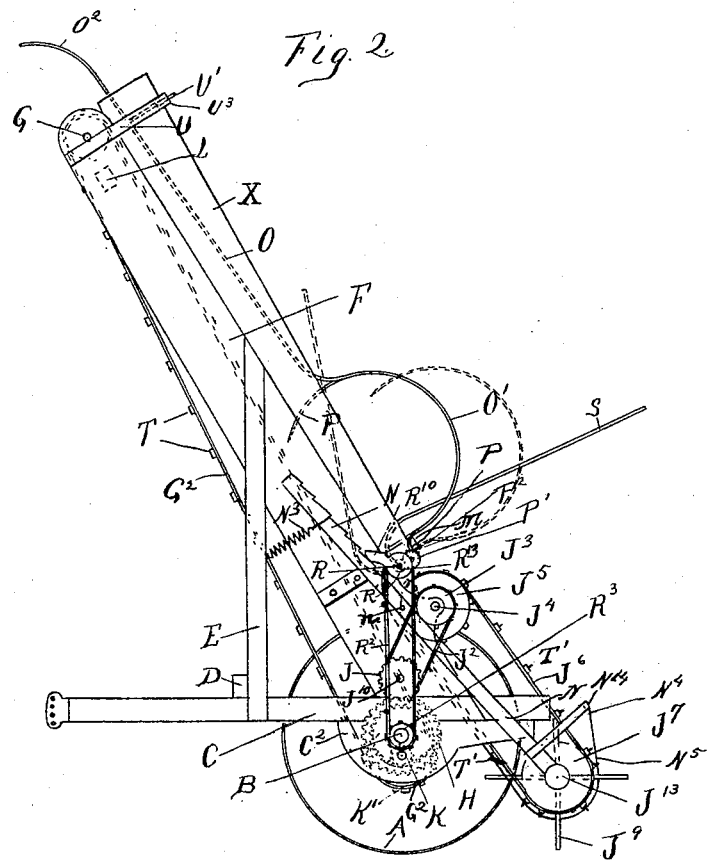

Figure 1 is a rear view of the machine, certain parts being omitted or shown in smaller scale on account of the complexity of the mechanism and the point of view. Fig. 2 is a side view. Fig. 3 is a rear elevation showing a detail of certain features. Figs. 4 and 5 are details of the bunching mechanism and fingers. Fig. 6 is a detail of one end of the bunching-finger shaft. Fig. 7 is a detail of the shaft and finger. Fig. 8 is a detail of the ends of the discharge-fingers.

Like parts are indicated by the same letter in all the figures.

A A are the bearing-wheels upon which the machine is supported; B B short axles projecting from the side pieces $C^2$, which are secured to the horizontal frame-pieces C C.

E E are vertical frame-bars; F F inclined side pieces for the frame. These pieces are connected at their ends by a cross-shaft G, having a sprocket-wheel $G'$ at each end, which is driven by a chain $G^2$, which in turn is driven from below by a sprocket-wheel $K'$ on the shaft K. This shaft is parallel to but somewhat below the axles and is journaled in the frame-pieces. On the chains $G^2$ are secured the cross-slats T T, which, with such chains, constitute the principal conveyer or elevator, which is driven by means of the pinion $K^2$ on the shaft K, which meshes with the internal gear H, which is secured to and driven by the wheel A on the shaft B. The gear and wheel are connected by the intermediate portion $K^3$ or may be connected in any way or be formed continuous with each other.

J is a gear, which engages the exterior surface of the gear H and is supported on the shaft $J^{10}$, which projects from a suitable bearing $J^{11}$ on the side of the frame-pieces F F. On this shaft is a sprocket-wheel $J'$, driving the chain $J^2$, which passes about the sprocket-wheel $J^3$ on the shaft $J^4$, which is journaled in the frame-pieces F F and carries at each end a sprocket-wheel $J^5$, each of which drives a chain $J^6$. These chains pass each over a sprocket-wheel $J^7$ of a transverse shaft $J^8$, and they carry a series of transverse slats $T'$, these chains, slats, and wheels comprising the secondary elevator. The shaft $J^8$ is itself supported at each end on a joint or socket $J^{13}$ on the end of the arm N, and this shaft carries a series of laterally-projecting teeth $J^9$, by which when rotated it gathers up the hay or straw from the ground. The arms N are pivoted at *n* to the inclined pieces F and have at their upper end ratchets $N'$, and their lower ends, carrying the shaft $J^8$, are held up by the springs $N^3$ $N^3$, secured at one end to the standard E and at the other end provided with hooks to engage such ratchets.

$N^4$ $N^4$ are arms upwardly projecting, one from each piece N and secured together by the cross-bar $N^{14}$, to which is secured a series of curved spring-guide slats $N^5$, which pass about the shaft $J^8$ and parallel with the elevator, and are secured at their other extremities to the transverse bar M, which is supported by brackets secured to the frame-pieces F F, and extends across the main elevator just above the upper end of the secondary elevator.

On the shaft B, at its outer extremity, is a sprocket-wheel $R^3$, which drives a chain $R^2$, which slides upon the pulley $R'$, which pulley is rigid upon the shaft R. This pulley has the arms $R^{10}$ to engage the trip projections $R^{11}$ on the chain $R^3$. The shaft R is suitably journaled at $R^{12}$ on the frame-piece M and carries the gear $R^{13}$, which meshes with the larger gear $P^3$ on the shaft $P'$, journaled at $P^{10}$ on the frame-piece M. Projecting from the shaft R and preferably secured to the lowest side thereof are the stripping-fingers S, and secured to the shaft $P'$ are the substantially semicircular curved bunching-fingers P. The bearings $R^{12}$ and $P^{10}$ for these shafts may be erected on the frame-pieces F F, if desired, or they may be upon the cross-piece M, as indicated in Fig. 4. The fingers may be attached to their respective shafts, as indicated in Fig. 7, the stripping-fingers being preferably straight throughout the greater portion of their length and having a bend near their ends which are secured to the shaft. At one end of the shaft P' there is a retracting spiral spring $P^6$, which tends to keep the parts in the position indicated in Fig. 2.

O O are guiding-fingers curved to conform to the curvature of the bunching-fingers P and rigidly secured to the cross-piece M, and terminate at their upper extremities in the curved ends $O^2$. Secured to the upper end of each guiding-finger is a rod U', which passes through a cross-piece $U^3$, which is supported by the standards U U on the sides of the frame-pieces F F. A pin $U^4$ passes through an aperture in each of such rods, and thus the fingers are prevented from descending upon the elevator, while they have a large latitude of movement to and from the same.

L is a cross-bar connecting the upper ends of the frame-pieces F F. The elevator-strips T are further supported upon the belts V V, running upon the pulleys V' V' on the shaft G and on similar pulleys on the shaft K. Similar belts W W are in like manner used to support the slats T' on the lower elevator, and are carried by the pulley W' W' on the shafts $J^4$ and $J^8$.

X X are guide-boards used, if desired, and preferably connected to and within the frame-pieces F F and above on the cross-piece $U^3$.

In Fig. 5 we have shown a diagrammatic view of a variation or modification in the use of the bunching-fingers P. It consists of the employment of rollers Y Y' $Y^2$, whereby the upper elevator, consisting of the chains $G^3$ and slats T, may be made to travel in a general direction, but with a downward depression, as indicated. The fingers P are then disposed, so as to project into this depression between the rollers Y and Y', and thus have their points normally below the line of motion of the elevator. Some of the features here described are not very fully and completely set out, since they constitute no part of my present invention.

We have only shown so much of the machine or shown it in such a general way as is necessary to make clear the operation of the elements and features which are a part of the present invention and which it is here our intention to claim. For this reason the general construction and the operation of many of the features of the machine here illustrated are substantially the same as those of the well-known hay-loaders.

Our invention relates more particularly to several features: first, the bunching mechanism; second, the bunch-delivering mechanism; third, the guiding-fingers; fourth, the spring-guide finger-slats; fifth, sundry details.

As to the bunching mechanism, the use and operation is as follows: The device in its normal condition, as indicated in Fig. 2, is attached to and drawn by a wagon and will gather the hay or straw from the stubble by the action of the rear gathering device and lift the same up to a point where it will be received between the two elevators and carried upwardly. It will be received by the fingers P P and there gathered into a bundle. This will be especially the result if the fingers are made to extend to the normal plane of motion of the elevator. The trips $R^{11}$ $R^{11}$ are so disposed and placed as to engage the arms $R^{10}$ $R^{10}$ at suitable intervals or when enough matter has been gathered by the bunching-fingers to make a suitable bunch for delivery. When these trips engage the arms, they rock or partially rotate the shaft R, and by reference to Fig. 2 it will be seen that this shaft will be rocked through about ninety degrees. This will bring the arms or discharge-fingers S down upon the bunch retained by the fingers P, while at the same time, by reason of the engagement of the pinions $R^{13}$ and $P^3$, the shaft P' will be rotated in the opposite direction forty-five degrees, as shown in dotted lines in Fig. 2. This is accomplished by properly proportioning the two gear-wheels. This will lift the fingers P, so that the discharge-fingers S will strip the hay from them and force the bundle down upon the elevator, where it will be carried upward beneath the guiding-fingers O. By this time the trip $R^{11}$ will have escaped the fingers $R^{10}$ and the parts will return to the position shown in Fig. 2, where another bundle may be accumulated. The parts will be restored to their initial positions by the retracting-spring $P^6$. The bundle so passed upward by the elevator will force the fingers O backward away from the elevator against their weight and tendency to spring down, and the entire bundle will be downwardly discharged or thrown by the curved form of the ends of the fingers, which are designed for this purpose. The bunching and bundle delivering mechanism is in this case practically the same and could operate with the guiding-fingers, so that the three elements together first collect the bundle, then discharge or force it upon the elevator, and then discharge it in a bundled condition downwardly upon the wagon. One of the difficulties encountered in hay-loaders where two elevators are employed or where there is any interruption or interference with the hay in the course of its elevation is that the hay will escape at the point of interruption or at the delivery end of such supplemental elevator and will be carried over by the upper elevator in the rear of the machine. This is obviated by our spring-curved guide-slats $N^5$, which lie just outside of the path of the supplemental elevator and terminate within the bunching apparatus, so that the hay or straw, instead of escaping over into the rear of the machine, is directed by them into the bunching device.

We claim—

1. In a hay-loader, the combination of an elevator to carry the hay upward, a buncher of substantially the width of the elevator arranged adjacent to the surface thereof between its ends to intercept the hay being elevated and collect it into bundles, means whereby the buncher is moved away from the elevator to permit the bundle to continue with the elevator, and a guide substantially equal in width to the width of the elevator, between which and the elevator the hay moves as a bundle after leaving the buncher.

2. In a hay-loader, the combination, with the elevator, of a bunching device of substantially the width of the elevator, consisting of curved fingers arranged adjacent to and above the elevator and between its ends and supported upon a rock-shaft, and means for intermittently automatically rocking such shaft to gather and discharge the bunch or bundle.

3. In a hay-loader, the combination, with the elevator, of a buncher consisting of substantially-semicircular fingers arranged adjacent to the elevator between its ends, and the guide-fingers curved at their lower ends to substantially correspond with the buncher-fingers and extending from the buncher to the discharge end of the elevator, whereby the hay after being bunched passes between the elevator and such guide-fingers to the place of delivery.

4. In a hay-loader, the combination, with the elevator, of the buncher situated adjacent to and between the ends of the elevator and consisting of curved bunching-fingers supported upon a rock-shaft, means for intermittently rocking such shaft to gather and discharge the bunch or bundle, and stripping-fingers supported on a rock-shaft and adapted in a like manner to be operated to strip the hay from the bunching-fingers.

5. In a hay-loader, in combination with an elevator, a bunching and discharge device located adjacent to and between the ends of the elevator and consisting of gathering and stripping fingers projecting from rock-shafts, and means for intermittently rocking such shafts in opposite directions.

6. In a hay-loader, the combination, with the elevator, of a bunching device located adjacent to and between the ends of the elevator and consisting of bunching and stripping fingers supported each series upon a rock-shaft, said rock-shafts being operatively connected, so as to rotate with different rapidities in opposite directions, and driving connections for the same from some driving part of the machine.

7. In a hay-loader, the combination of an elevator, with a bunching device arranged between its ends, a supplemental elevator arranged above the lower portion of the main elevator, guide-slats passing parallel with the latter elevator and terminating at the bunching device, and a cross-piece, to which the upper ends of the said guide-slats are secured.

GEORGE A. DICKERMAN.
JOSEPH P. ELLACOTT.

Witnesses:
CELESTE P. CHAPMAN,
W. E. GASTMAN.